United States Patent
Gormley

(10) Patent No.: US 10,138,843 B2
(45) Date of Patent: Nov. 27, 2018

(54) DRAG LINK ASSEMBLY FOR A THRUST REVERSER

(71) Applicant: ROHR, INC., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 427 days.

(21) Appl. No.: 14/941,717

(22) Filed: Nov. 16, 2015

(65) Prior Publication Data

US 2017/0138304 A1 May 18, 2017

(51) Int. Cl.
*F02K 1/72* (2006.01)

(52) U.S. Cl.
CPC .................. *F02K 1/72* (2013.01)

(58) Field of Classification Search
CPC ..... F02K 1/70; F02K 1/72; F02K 1/62; F02K 1/625
See application file for complete search history.

(56) References Cited

U.S. PATENT DOCUMENTS

| | | | |
|---|---|---|---|
| 4,564,160 A * | 1/1986 | Vermilye | F02K 1/72 239/265.29 |
| 4,698,964 A * | 10/1987 | Glancy | F04D 27/0215 244/110 B |
| 4,909,442 A | 3/1990 | Fernz | |
| 5,309,711 A * | 5/1994 | Matthias | F02K 1/72 239/265.29 |
| 7,124,981 B2 | 10/2006 | Parham | |
| 7,146,796 B2 | 12/2006 | Lair | |
| 8,109,467 B2 | 2/2012 | Murphy | |
| 8,511,973 B2 | 8/2013 | Ramlaoui et al. | |
| 8,516,790 B2 * | 8/2013 | Hogie | F02K 1/766 239/265.25 |
| 2007/0007388 A1 * | 1/2007 | Harrison | F02K 1/72 244/110 B |
| 2009/0151320 A1 * | 6/2009 | Sternberger | F02K 1/72 60/226.2 |
| 2012/0006000 A1 * | 1/2012 | Vauchel | F02K 1/1261 60/226.2 |
| 2013/0047580 A1 * | 2/2013 | Beardsley | B64D 29/06 60/226.2 |
| 2013/0062434 A1 * | 3/2013 | Vauchel | B64D 29/06 239/265.19 |
| 2013/0219857 A1 | 8/2013 | Zysman et al. | |
| 2015/0107221 A1 | 4/2015 | Aten et al. | |

FOREIGN PATENT DOCUMENTS

EP 2857666 A1 4/2015

* cited by examiner

*Primary Examiner* — Gerald L Sung
(74) *Attorney, Agent, or Firm* — Cantor Colburn LLP

(57) ABSTRACT

A thrust reverser operable within a flowpath defined in-part by a surface carried by a fixed structure includes a translating sleeve constructed and arranged to move between first and second positions and a blocker door pivotally engaged to the translating sleeve for pivotal movement between a first state and a second state. A drag link assembly of the thrust reverser includes a base joint, a mid joint, and a distal joint. A base link extends between the base and mid joints, and a drag link extends between the mid and distal joints. The base joint operably connects the base link to the fixed structure, the mid joint operably connects the base link to the drag link, and the distal joint operably connects the drag link to the blocker door. The base joint and the mid joint are disposed beneath the surface when the blocker door is in the first state.

10 Claims, 6 Drawing Sheets

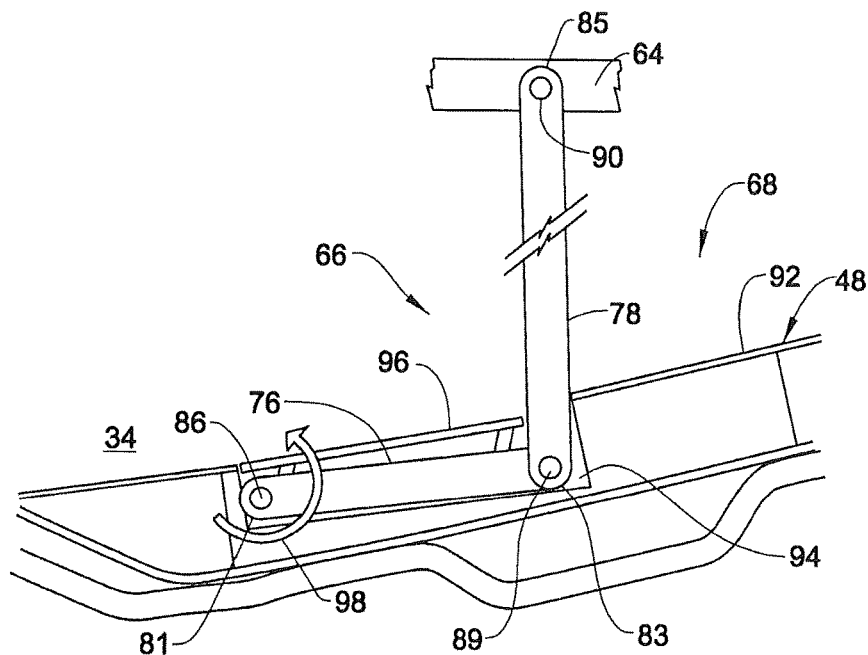
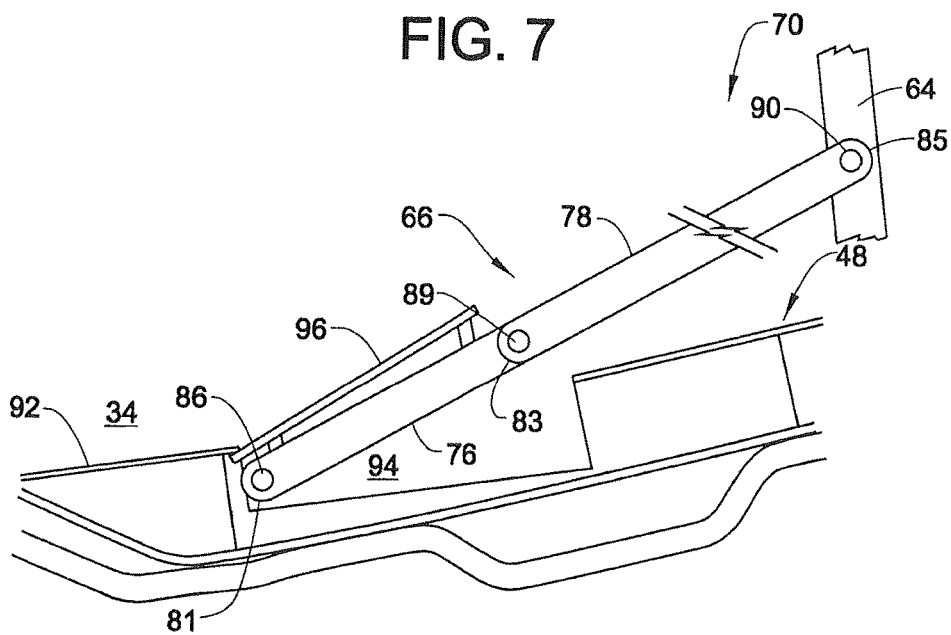

DRAG LINK ASSEMBLY FOR A THRUST REVERSER

BACKGROUND

The present disclosure relates to a thrust reverser for a turbofan engine and more particularly to a drag link assembly of the thrust reverser.

Turbofan engines are known to include a fan section that produces a bypass airflow for providing the majority of engine propulsion and a combustion or core airflow for compression, mixing with fuel, combustion and expansion through a turbine to drive the fan section. The engines further include nacelles that partially surround the core of the engine, include a pylon for securing the engine to a structure such as an aircraft wing, and provide an annular bypass airflow duct for directing the bypass airflow in a rearward direction to produce forward propulsion. The nacelles may further include thrust reversers capable of redirecting the bypass airflow from the rearward direction to, at least partially, a forward direction thus producing a rearward propulsion. As an example, such rearward propulsion may serve to decelerate the forward motion of an aircraft soon after landing.

Thrust reversers may include a plurality of blocker doors capable of changing positions through a kinematic linkage from a stowed position for forward propulsion to a deployed position for rearward propulsion. In one style of thrust reverser, the linkage may include a drag link that is pivotally mounted to a blocker door on one end and to the inner fixed structure (which forms an aerodynamic fairing inside of the fan duct around the engine) on its opposite end. The pivotal joint between the drag link and the inner fixed structure is formed with a fitting. The fitting may add to the overall drag of the thrust reverser. This invention primarily concerns reducing the drag created by such a fitting.

SUMMARY

A thrust reverser operable within a flowpath defined in-part by a surface carried by a fixed structure, the thrust reverser according to one, non-limiting, embodiment of the present disclosure includes a translating sleeve constructed and arranged to move between first and second positions with respect to the surface; a blocker door pivotally engaged to the translating sleeve for pivotal movement between a first state and a second state; and a drag link assembly including a base joint, a mid joint, a distal joint, a base link extending between the base and mid joints, and a drag link extending between the mid and distal joints, and wherein the base joint operably connects the base link to the fixed structure, the mid joint operably connects the base link to the drag link, and the distal joint operably connects the drag link to the blocker door, and wherein the base joint and the mid joint are disposed beneath the surface when the blocker door is in the first state.

Additionally to the foregoing embodiment, the base link is disposed beneath the surface when the blocker door is in the first state.

In the alternative or additionally thereto, in the foregoing embodiment, the mid joint is spaced outward from the surface when the blocker door is in the second state.

In the alternative or additionally thereto, in the foregoing embodiment, the base link is disposed in-part outward from the surface when the blocker door is in the second state.

In the alternative or additionally thereto, in the foregoing embodiment, the drag link is spaced outward from the surface when the blocker door is in the second state.

In the alternative or additionally thereto, in the foregoing embodiment, base joint is a spring loaded joint configured to bias the blocker door toward the first state.

In the alternative or additionally thereto, in the foregoing embodiment, the base, mid, and distal joints are pivotal joints.

In the alternative or additionally thereto, in the foregoing embodiment, the base, mid and distal pivotal joints each have a pivot axis substantially parallel to one-another.

In the alternative or additionally thereto, in the foregoing embodiment, the base link is in a cavity defined by the fixed structure when the blocker door is in the first state.

In the alternative or additionally thereto, in the foregoing embodiment, the cavity communicates through the surface and the drag link assembly includes a cover disposed flush with the surface when the blocker door is in the first state.

In the alternative or additionally thereto, in the foregoing embodiment, the cover is engaged to the base link.

In the alternative or additionally thereto, in the foregoing embodiment, the first state is a stowed state and the second state is a deployed state that re-directs fluid flow within the flowpath.

A nacelle for a turbofan engine according to another, non-limiting, embodiment includes a fixed structure including a surface facing radially outward and defining in-part an annular bypass flowpath; a translating sleeve constructed and arranged to move between a forward and aft positions; a blocker door pivotally engaged to the translating sleeve for pivotal movement between a stowed state and a deployed state for redirecting airflow in the flowpath; and a drag link assembly including a base joint and a cover, wherein the base joint is operably connected to the fixed joint beneath the surface and the cover is flush with the surface when the blocker door is in the stowed state.

Additionally to the foregoing embodiment, the drag link assembly includes a mid joint, a distal joint, a base link extending between the base and mid joints, and a drag link extending between the mid and distal joints, and wherein the base joint operably connects the base link to the fixed structure, the mid joint operably connects the base link to the drag link, and the distal joint operably connects the drag link to the blocker door, and wherein the mid joint is disposed beneath the surface when the blocker door is in the stowed state.

In the alternative or additionally thereto, in the foregoing embodiment, the mid joint and the drag link are spaced radially outward from the surface when the blocker door is in the deployed state.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 6 is a side partial sectional view of a drag link assembly of the thrust reverser illustrated with the thrust reverser in the stowed state; and FIG. 7 is a side partial sectional view of the drag link assembly of the thrust reverser illustrated with the thrust reverser in the deployed state.

DETAILED DESCRIPTION

Figure 1:
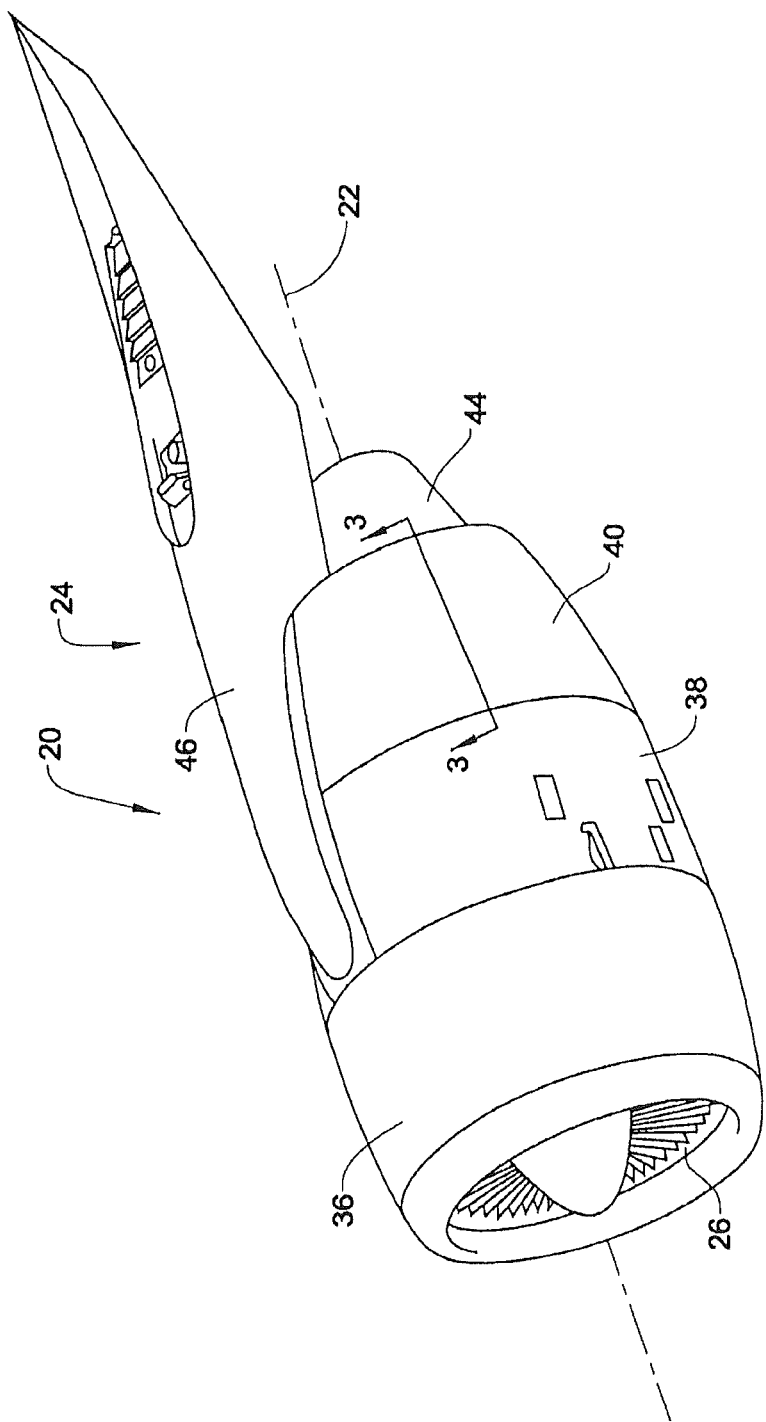
FIG. 1 is a perspective view of a turbofan engine of the present disclosure.
Figure 2:
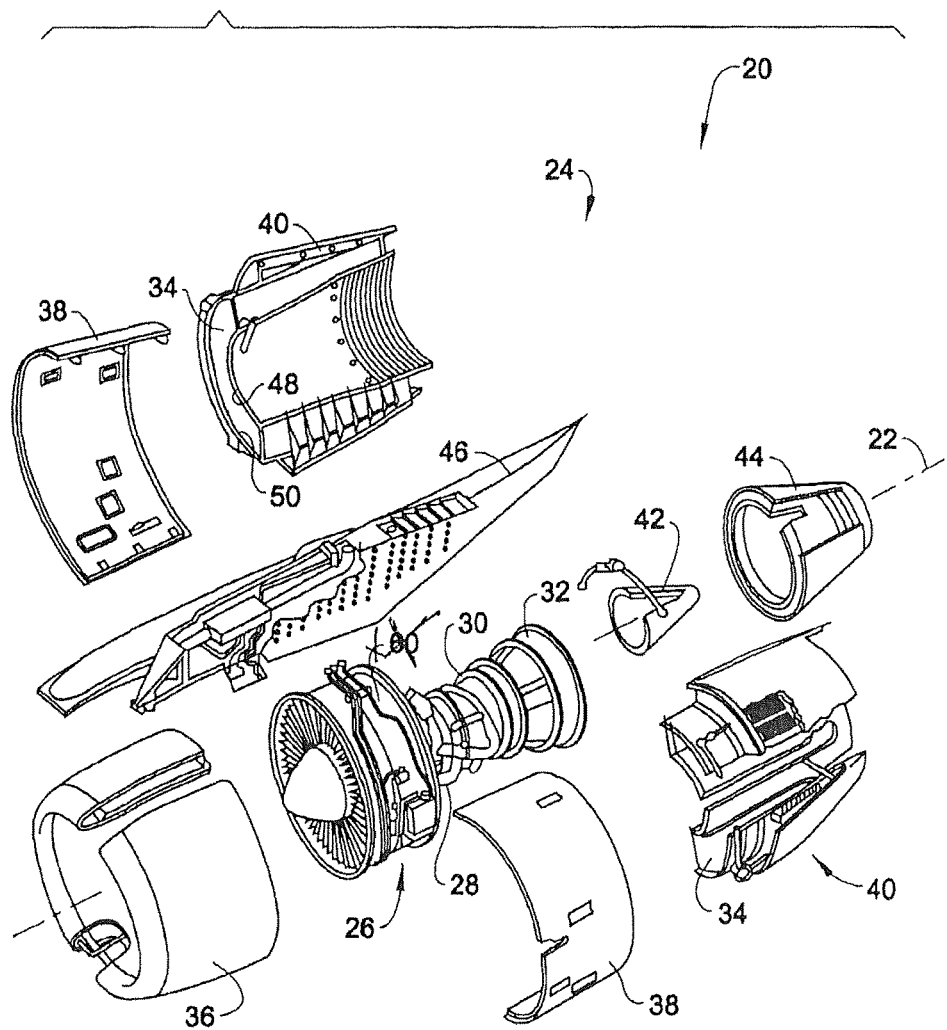
FIG. 2 is an exploded view of the turbofan engine.

Referring to FIGS. 1 and 2, a turbofan engine 20 is illustrated as a non-limiting exemplary embodiment of the present disclosure. The turbofan engine 20 is centered about an axis 22 and includes a nacelle 24 that generally surrounds an inner engine core that includes a fan section 26, a compressor section 28, a combustor section 30 and a turbine section 32. The fan section 26 drives air along a bypass flowpath or duct 34 and the combustor section 30 receives a portion of air from the fan section 26 and drives air along a core flowpath (not shown) for compression by the compressor section 28, then into the combustor section 30. The core air is mixed with fuel in the combustor section 30 and burned producing energy. The core air or exhaust from the combustor section 30 is expanded through the turbine section 32 and, in-turn, drives a central shaft (not shown) that powers the fan section 26.

The combusted core airflow generally powers the fan section 26 and the bypass airflow provides the majority of forward propulsion for the engine 20. More traditional turbofan engines may have a bypass airflow to core airflow ratio (i.e. bypass ratio) of about six (6:1). More recent high-bypass ratio engines, such as a geared turbofan engine may have greater bypass ratios that may exceed ten (10:1).

The nacelle 24 may include an intake cowl 36 disposed forward of the fan section 26, a fan cowl 38 that circumferentially surrounds and shields the fan section 26, a thrust reverser 40 that may circumferentially surround a portion of the compressor, the combustor and turbine sections 28, 30, 32, an exhaust centerbody 42 disposed aft of the turbine section 32, an exhaust nozzle 44 that is spaced radially outward from the exhaust centerbody 42, and a pylon 46 that supports the engine 20 typically to an underside of an aircraft wing (not shown).

Figure 3:
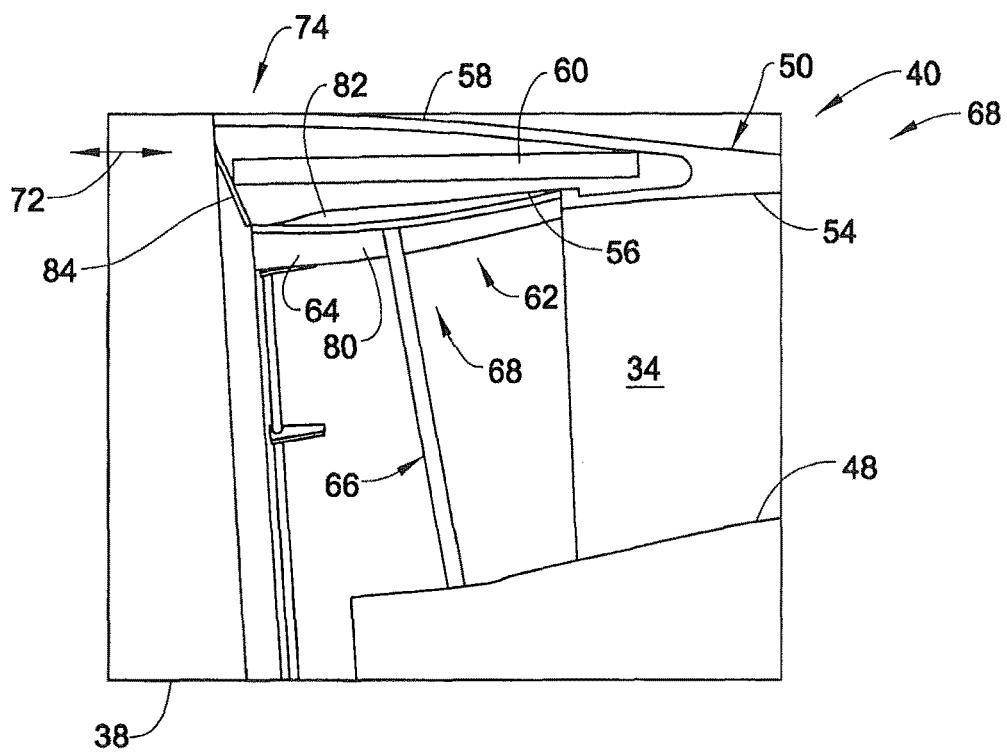
FIG. 3 is a partial cross section of a thrust reverser in a stowed state.
Figure 4:
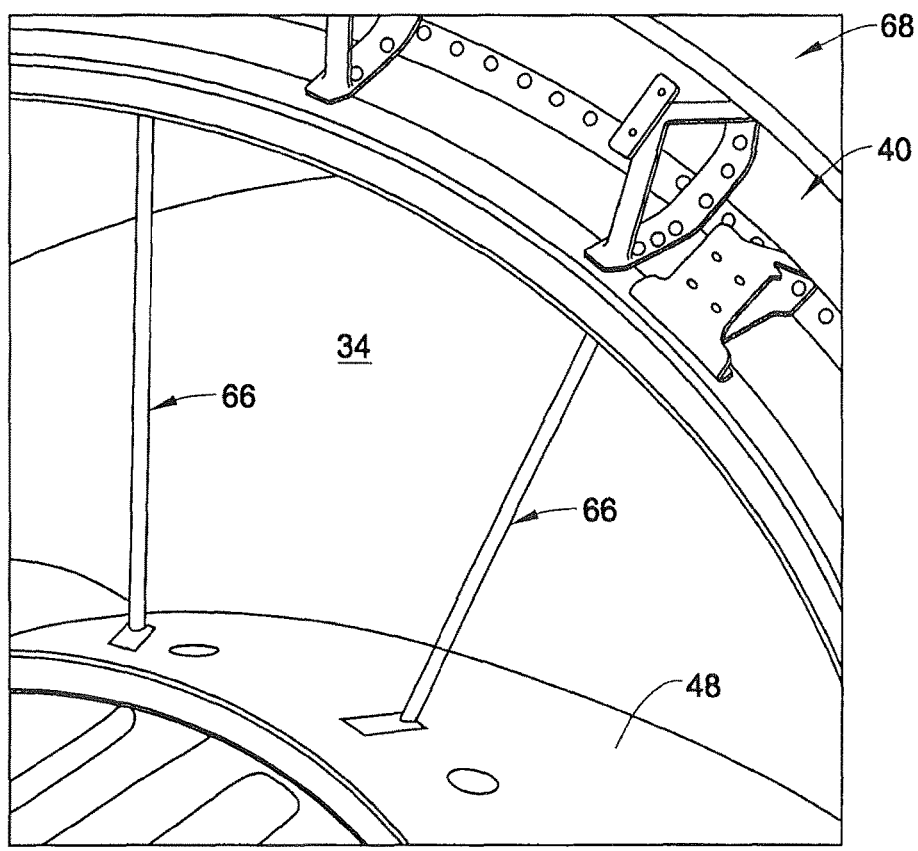
FIG. 4 is a partial perspective view of the thrust reverser in the stowed state.

Referring to FIGS. 2 through 4, the thrust reverser 40 may be formed from two halves that are hinged to the pylon 46 to move between a closed position in which they form together an annular enclosure around the engine 20, and an open position in which the two halves are opened to provide access to the engine for maintenance purposes. Each half of the thrust reverser 40 generally has a radially inner shell 48 referred to as an inner fixed structure (IFS) in the most common thrust reverser designs, and a translating sleeve 50 spaced radially outward from the IFS 48. The bypass flowpath 34 is defined by and located radially between the IFS 48 and the translating sleeve 50; may be generally annular in shape; and, may be located immediately downstream of the fan section 26.

The translating sleeve 50 is typically formed from an inner panel 56 and outer shell 58. In the forward portion of the translating sleeve 50, the inner panel 56 and outer shell 58 are spaced apart radially to accommodate between them a cascade array 60. As the translating sleeve 50 translates aft during deployment of the thrust reverser 40, the cascade array 60 is exposed, and while the thrust reverser 40 is stowed, the cascade array is housed between the inner panel 56 and the outer shell 58. Each half of the thrust reverser 40 may also include two beams (not shown), with one beam located at a six o'clock position and the second beam located at a 12 o'clock position (i.e., diametrically opposite locations). Spanning between the forward portions of each of the beams is a half cylindrical structure typically referred to as a torque box. The IFS 48 also spans between and is attached to the two beams. In the thrust reverser stowed position, the forward edge of the outer shell 58 generally aligns with the aft edge of the fan cowl to form a smooth aerodynamic surface, while the forward edge of the inner panel 56 generally aligns with the torque box and the aft edge of the fan case to form a smooth aerodynamic surface.

A plurality of blocker door devices 62 of the thrust reverser 40 are distributed circumferentially about the engine axis 22. Each device 62 has a blocker door 64 that is generally located radially inward of the inner panel 56 of the translating sleeve 50. The blocker door 64 and the translating sleeve 50 are both capable of coincidental movement relative to the torque box and IFS 48, thereby re-directing bypass airflow in the bypass flowpath 34 that may generally change aircraft power between forward propulsion and reverse propulsion. Each blocker door device 62 may further include a drag link assembly 66 capable of providing door stability and guiding movement of the blocker door 64 between a stowed state 68 (see FIGS. 3 and 4) for forward aircraft propulsion and a deployed state 70 (see FIG. 5) for reverse or rearward aircraft propulsion.

Figure 5:
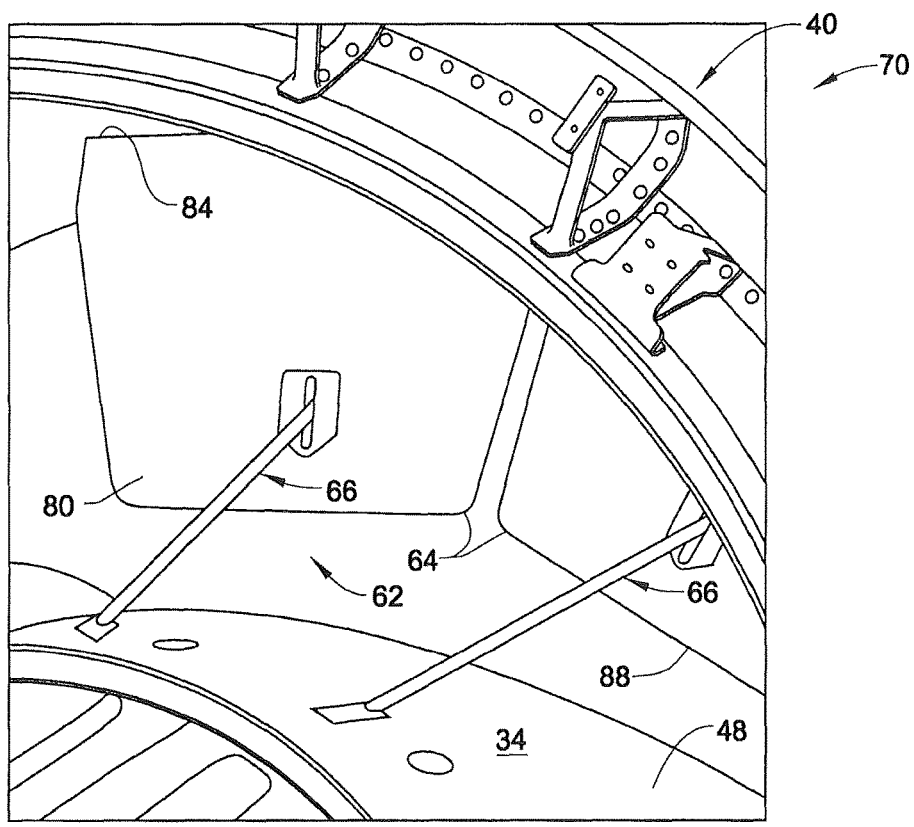
FIG. 5 is a partial perspective view of the thrust reverser in a deployed state.

Referring to FIGS. 3-5, the translating sleeve 50 is driven substantially in an axial direction (see arrow 72) generally parallel to the engine axis 22, between a retracted or forward position 74 (see FIG. 3), placing the blocker door 64 in the stowed state 68, and an aft position (not shown) placing the blocker door 64 in the deployed state 70. When in the forward position 74, the translating sleeve 50 may be substantially axially aligned to, and located radially outward from, the stowed blocker door 64. When in the aft position, the translating sleeve 50 may be substantially, axially, rearward to (i.e. aft of) the blocker door 64; and, located substantially radially outward from the blocker door 64.

At least one master actuator (not shown) of the thrust reverser 40 powers the axial movement of the translating sleeve 50 and may (as non-limiting examples) be hydraulically or electrically actuated or a combination of both. The actuator may have a drive unit secured rigidly to the torque box on one end thereof and a linked to the translating sleeve 50 on the opposite end, and capable of being extended and retracted. The actuator may be described as a 'master' and the drag link assembly 66 may be described as a 'slave linkage' in the sense that the actuation of drag link assembly 66 is directly dependent upon the driven motion of the translating sleeve 50. That is, without linear motion of structure 50, the drag link assembly 66 may not move.

Referring to FIGS. 3 through 5, the blocker door 64 has an exposed surface 80 that defines in-part the bypass flowpath 34 and an opposite surface 82 that faces radially outward and toward the inner panel 56 when the blocker door 64 is in the stowed state 68 (see FIGS. 3 and 4). When in the deployed state 70 (see FIG. 5), the surface 80 of the blocker door 64 may face in a substantially axial, upstream, direction. The blocker door 64 further has and extends between a base or edge portion 84 attached to a forward end of the pressure sleeve 56 of the translating sleeve 50 by a pivotal connection (not shown), and an opposite distal edge 88 (see. FIG. 5). When in the deployed state 70, the blocker door 64 extends substantially radially; the edge portion 84 of the door 64 remains pivotally engaged to the inner panel 56, and the distal edge 88 may be proximate to the IFS 48. The blocker door 64 may be capable of 'compound motion' that includes: (1) linear motion attributable to the door 64 being directly engaged to the translating sleeve 50, and (2) rotational or pivotal motion attributable to the rotational capability of the pivotal connection (not shown) and the drag link assembly 66.

Referring to FIGS. 5-7, the drag link assembly 66 may include a base link 76 and a drag link 78. The base and drag links 76, 78 may each be elongated with the base link 76 having a first end pivotally engaged to the IFS 48 via a base joint 81, an opposite second end engaged to a first end of the drag link 78 via a mid joint 83 and an opposite second end of the drag link 78 engaged to the blocker door 64 via a distal joint 85 near its distal edge 88. The joints 81, 83, 85 may each be pivotal joints each having a respective pivot axis 86, 89, 90 that may be substantially parallel to one-another and substantially normal to direction 72.

A surface 92 of the IFS 48 may face radially outward, may be circumferentially continuous, and defines in-part the flowpath 34. The base joint 81 is located beneath the surface 92 and may be in a cavity 94 having boundaries defined by the IFS 48. The cavity 94 is in fluid communication with the flowpath 34 through the surface 92.

Referring to FIG. 6, when the blocker door 64 is in the stowed state 68, the base link 76, the base joint 81, the mid joint 83, and a relatively small portion of the drag link 78 is in the cavity 94 beneath the surface 92. The drag link 78 projects radially outward from the mid joint 83, traverses the flowpath 34 and pivotally engages the stowed blocker door 64 via the distal joint 85. The drag link assembly 66 may further include a cover 96 that conforms to the contours of the surface 92. When the blocker door 64 is in the stowed state 68 the base link 76 is stowed in the cavity 94, the cover 96 is flush with the surface 92 to reduce the drag of fluid flow (e.g., air) through the flowpath 34. To minimize fluid flow drag, the seam between the cover 96 and the surface 92 may be relatively tight.

Referring to FIG. 7, when the blocker door 64 is in the deployed state 70, the the base joint 81 and a portion of the base link 76 remain in the cavity 94 beneath the surface 92. The mid joint 83 may be spaced radially outward from the surface 92 and the entire drag link 78 may be radially spaced outward from the surface 92. Because the cover may be engaged to the base link 76, the cover does not remain flush with the surface 92, and instead moves into the flowpath 34 with the base link 76. It is further contemplated and understood that the cover 96 may be connected or hinged directly to the IFS 48 at an upstream end and still move with the base link 76 as the blocker door 64 moves between the stowed and deployed states 68, 70.

The base joint 81 may further be optionally spring loaded or otherwise configured to generally bias the blocker door 64 toward the stowed state via torsional force (see arrow 98 in FIG. 6). The spring and lost motion device also accommodates dimensional and deflection difference between the IFS and the blocker doors/translating sleeve, thereby assuring there is no undesirable load paths.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

I claim:

1. A thrust reverser operable within a flowpath defined in-part by a surface carried by a fixed structure, the thrust reverser comprising:
 a translating sleeve constructed and arranged to move between first and second positions with respect to the surface;
 a blocker door pivotally engaged to the translating sleeve for pivotal movement between a first state and a second state; and
 a drag link assembly including a base joint, a mid joint, a distal joint, a base link extending between the base and mid joints, and a drag link extending between the mid and distal joints, and wherein the base joint operably connects the base link to the fixed structure, the mid joint operably connects the base link to the drag link, and the distal joint operably connects the drag link to the blocker door, wherein the base joint and the mid joint are disposed beneath the surface when the blocker door is in the first state, wherein the mid joint is spaced outward from the surface when the blocker door is in the second state, and wherein the base, mid, and distal joints are pivotal joints.

2. The thrust reverser set forth in claim 1, wherein the base link is disposed beneath the surface when the blocker door is in the first state.

3. The thrust reverser set forth in claim 1, wherein the base link is disposed in-part outward from the surface when the blocker door is in the second state.

4. The thrust reverser set forth in claim 1, wherein the drag link is spaced outward from the surface when the blocker door is in the second state.

5. The thrust reverser set forth in claim 1, wherein base joint is a spring loaded joint configured to bias the blocker door toward the first state.

6. The thrust reverser set forth in claim 1, wherein the base, mid and distal pivotal joints each have a pivot axis substantially parallel to one-another.

7. The thrust reverser set forth in claim 1, wherein the base link is in a cavity defined by the fixed structure when the blocker door is in the first state.

8. The thrust reverser set forth in claim 7, wherein the cavity is in fluid communication with the flowpath, and the drag link assembly includes a cover disposed flush with the surface when the blocker door is in the first state.

9. The thrust reverser set forth in claim 8, wherein the cover is engaged to the base link.

10. The thrust reverser set forth in claim 1, wherein the first state is a stowed state and the second state is a deployed state that re-directs fluid flow within the flowpath.

* * * * *